United States Patent [19]

Lehureau

[11] Patent Number: 5,089,923
[45] Date of Patent: Feb. 18, 1992

[54] STATIC MAGNETIC READING HEAD HAVING A PLURALITY OF ELEMENTARY HEADS

[75] Inventor: Jean-Claude Lehureau, Sainte Genevieve des Bois, France

[73] Assignee: Thomson-CSF, Puteaux, France

[21] Appl. No.: 506,221

[22] Filed: Apr. 6, 1990

[30] Foreign Application Priority Data

Apr. 14, 1989 [FR] France ................. 89 04965

[51] Int. Cl.$^5$ .................... G11B 5/17; G11B 5/23; G11B 5/265; G11B 5/187
[52] U.S. Cl. .................... 360/121; 360/115; 360/119; 360/122; 360/123
[58] Field of Search ............. 360/110, 123, 119, 121, 360/127, 115, 122, 126

[56] References Cited

U.S. PATENT DOCUMENTS

| | | | |
|---|---|---|---|
| 2,762,861 | 9/1956 | Somers | 178/6.6 |
| 3,626,396 | 12/1971 | Eastman et al. | 340/174.1 F |
| 3,662,361 | 5/1972 | Mee | 340/174.1 F |
| 4,751,598 | 6/1988 | Hamilton | 360/110 |
| 4,992,897 | 2/1991 | Deroux-Dauphin | 360/126 |

FOREIGN PATENT DOCUMENTS

2090196 1/1972 France.
8203938 11/1982 World Int. Prop. O..

OTHER PUBLICATIONS

IBM Technical Disclosure Bulletin, vol. 9, No. 2, Jul. 1966, Armonk, N.Y. U.S.A., p. 124, J. R. Morrison et al.: "Readback Head for High-Density Recording".
IBM Technical Disclosure Bulletin, vol. 3, No. 11, Apr. 1961, Armonk, N.Y. U.S.A., p. 18, J. Flora et al.: "Multitrack Probe Type Recording Transducer".
Patent Abstracts of Japan, vol. 10, No. 195 (P-475) (2251) Jul. 9, 1986, JP-A-61 039914, Feb. 26, 1986.

*Primary Examiner*—Robert S. Tupper
*Attorney, Agent, or Firm*—Oblon, Spivak, McClelland, Maier & Neustadt

[57] ABSTRACT

The disclosed static reading head includes a dense network of micro-heads. Each of these micro-heads has a magnetic circuit body made of ferrite, closed by the tape to be read through narrow Permalloy pieces. The micro-heads are associated with lines of excitation wires supplied with DC current with a high-frequency component, and columns of reading wires connected to detection circuits.

15 Claims, 3 Drawing Sheets

STATIC MAGNETIC READING HEAD HAVING A PLURALITY OF ELEMENTARY HEADS

BACKGROUND OF THE INVENTION

1. Field of the Invention

The present invention pertains to a static magnetic reading head.

2. Description of the Prior Art

To write pieces of information such as video signals on a magnetic tape and then read the recorded tape, a rotary (heliscan type) magnetic head is generally used, enabling a large number of tracks to be recorded and then re-read. There are difficulties in the fabrication and positioning of a magnetic head such as this because it is movable and must be positioned with high precision.

For reading the tapes thus recorded, there are also known magneto-optical transducers associated with retinas in CCD technology. These reading systems also require a very precise positioning of their constituent elements.

An object of the present invention is an easily-implanted low-cost static reading head enabling the reading of magnetic tapes recorded in a standard way.

SUMMARY OF THE INVENTION

The reading head according to the invention comprises several elementary heads, each having a magnetic circuit with a practically linear characteristic of magnetization, closed by the magnetic tape to be read through a magnetically non-linear element, and each of these elementary heads cooperates with an excitation wire and a signal wire, all these wires forming a matrix of lines and columns.

According to an advantageous aspect of the invention, the excitation wires are supplied with DC current on which very high frequency RF signals are superimposed.

According to another aspect of the invention, the magnetic head is connected to operate as a line-scanning and tape-exploring head.

According to yet another aspect of the invention, said wires form a substantially orthogonal network, and the linear part of the magnetic circuit has a symmetry, the non-linear element of this magnetic circuit being oblique with respect to the wires of the network.

BRIEF DESCRIPTION OF THE DRAWINGS

The present invention will be understood more clearly from the detailed description of an embodiment, taken as a non-restrictive example, and illustrated by the appended drawings, wherein.

DESCRIPTION OF A PREFERRED EMBODIMENT

Figure 1:
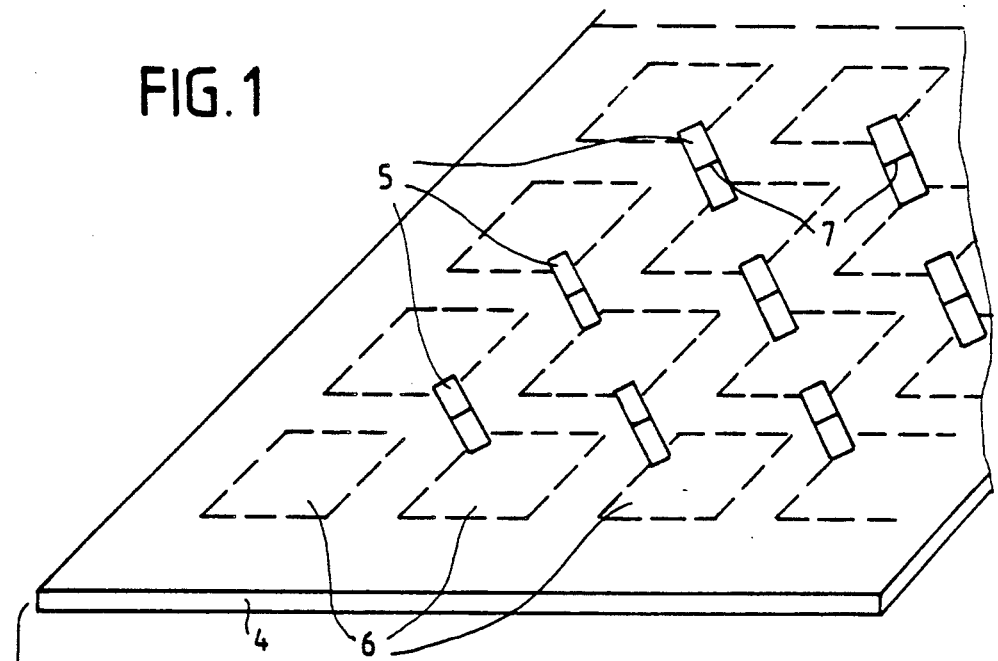
FIG. 1 is a partial view, in perspective, of a magnetic head.
Figure 1:
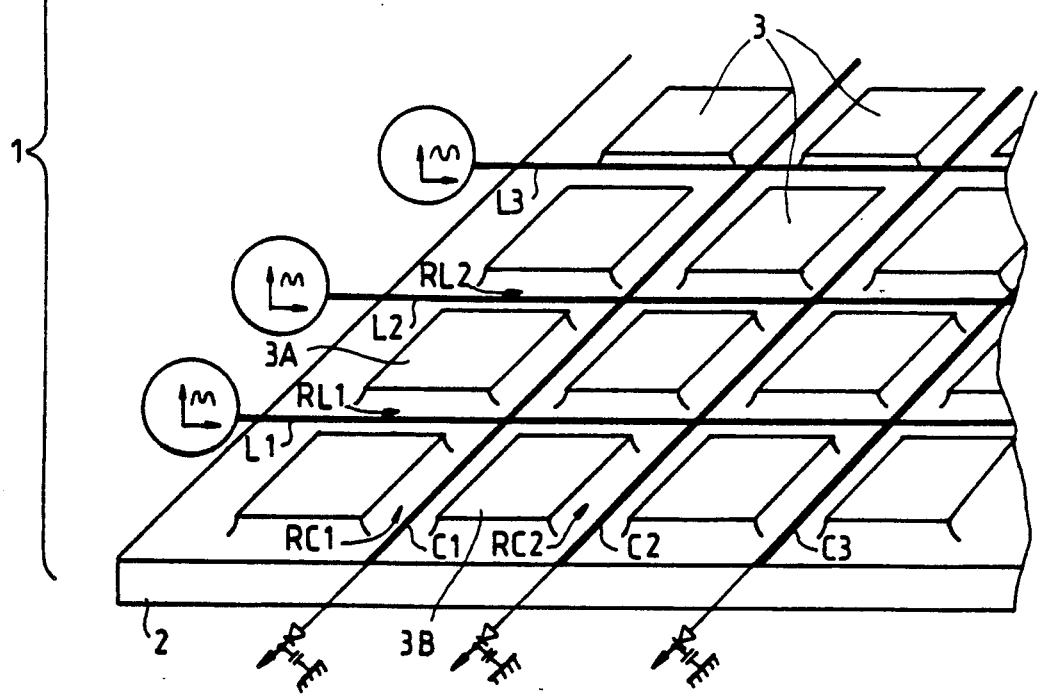

The magnetic head according to the invention is formed by a dense network of reading micro-heads (elementary heads) arranged in a matrix. This matrix may include, for example, 16 lines of 16 micro-heads each, to read a magnetic video tape. This head 1 has, for example, a topology of the type described in the French patent application No. 88 05592 and shown in FIG. 1. However, the making of the micro-heads and the network of wires are different. For, according to the above-mentioned patent application, the extensions (references $17_1$, $18_1$ in this patent application) of the pole pieces (17, 18) are generally made with the same materials as the pole pieces. By contrast, according to the present invention, this head 1, for the embodiment shown, essentially has a base plate 2 made of a material with low relative magnetic permeability, such as ferrite. In this base plate, an appreciably orthogonal network of grooves in lines (RL1, RL2...) and in columns (RC1, RC2...) is made. Line conductors L1, L2, ... and column conductors C1, C2... are placed in these grooves. This network of grooves determines blocks 3 on the plate 2, the upper face of which is substantially square-shaped, preferably slightly trapezoidal, for the reasons explained here below. The plate 2 is covered with a plate 4 of the same area, made of a non-magnetic material, for example glass, on which a network of pole pieces 5, made of a material with high relative permeability, such as Permalloy or Sendust, is deposited. These pole pieces 5 have the shape of rectangles all parallel to one of the diagonals of the plate 4, joining the facing corners of the blocks 3 placed symmetrically with respect to the intersection of a line groove and a column groove (such as, for example, the blocks 3A, 3B). As shown in dashes on the plate 4, pole pieces 6 can be laid on this plate 4. These pole pieces 6 have the same shape and the same area (or a slightly greater area) than the blocks 3 with respect to which they are centered, and they are made of the sam material and at the same time as the pieces 5. According to another embodiment shown in FIGS. 2 and 3, there are line conductors and row conductors in the corresponding grooves of the plate 2, and these grooves are filled with a non-magnetic material (resin, glass . The upper face of the plate 2 is then polished, and the pieces 5 are laid directly thereon. The pieces 5 are cut in their middle by a gap 7.

Figure 2:
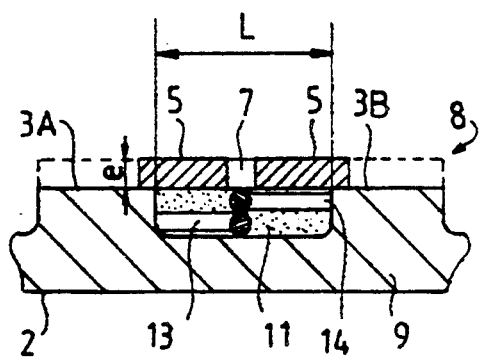
FIG. 2 is a simplified sectional view of an elementary head according to the invention.
Figure 3:
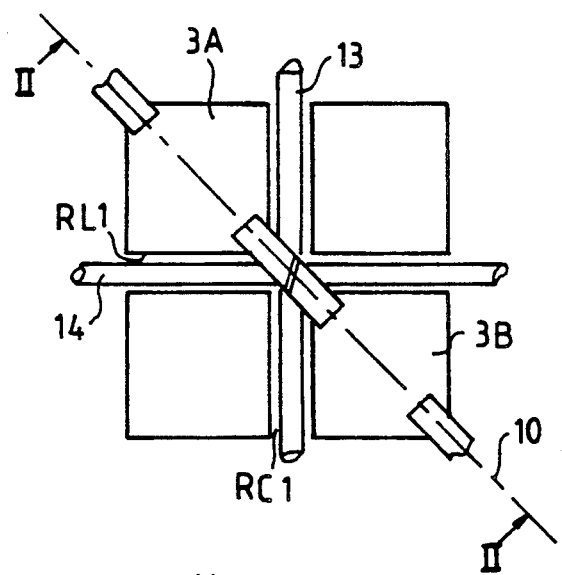
FIG. 3 is a schematic, plane view of the elementary head of FIG. 1 with some line and column wires with which it cooperates.

As shown in detail in FIG. 2, each micro-head 8 has a magnetic circuit, the body 9 of which formed by two blocks 3A, 3B (as defined above, each having one of its diagonals merged with the extension of one diagonal of the other: section line 10 in FIG. 3) and the corresponding part of the plate 2. This body 9 is made of a material with low reluctance, for example ferrite. This body 9 is roughly U-shaped. Its opening, which is about 1 mm wide, may be filled with a non-magnetic material 11, for example glass. The upper face of the body 9, thus filled, is polished and its central part (namely the upper face of the material 11 and facing corners of the blocks 3A, 3B) is covered with a thin layer 5 (for example, with a thickness of about 0.1 $\mu$m) of material with high magnetic reluctance (for example Permalloy). This layer 5 has, for example, the shape of a rectangle, cut in its middle by the gap 7. The gap 7 has a width of about 0.3 $\mu$m for example. As shown in broken lines in FIG. 2, the entire surface of the blocks 3A, 3B may be covered with this material having high reluctance. This practically has no adverse effect on the working of the micro-head, since the major condition to be met is that the part of the layer 5 located between the arms of said "U" shape will have a smaller width-than the blocks 3.

A column conductor 13 and a line conductor 14 goes through the cavity 12 surrounded by the body 3.

Preferably, the line conductors are substantially orthogonal to the column conductors, at least in the crossing of each magnetic circuit, namely in the zone of their mutual intersection.

If L is the length of the part of the layer 5 located on the material 11, $\mu_r$ its relative permeability and e its thickness, L should be substantially equal to the product $\mu_r.e$. If, for example, $\mu_r=1000$ and $e=0.1$, a value of 100 $\mu m$ is found for L.

Figure 4:
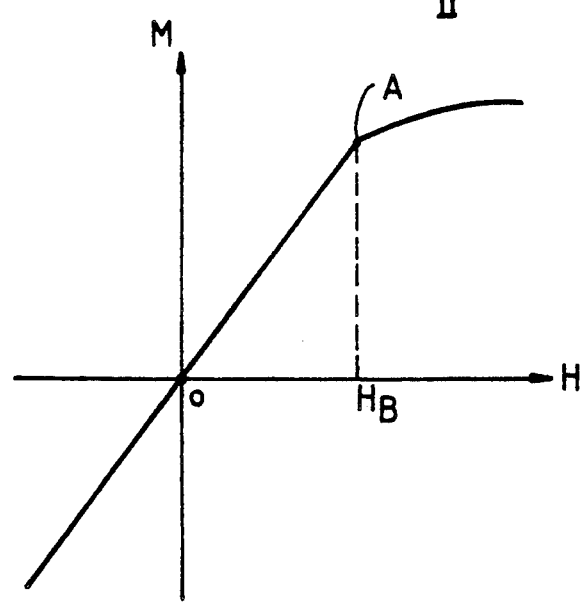
FIG. 4 is a graph of the excitation voltage of a line of the head of FIG. 1.

Part of the wires, for example the line wires, are used to produce the excitation of the individual micro-heads. To this effect, a DC current bias $I_B$ is applied to them. On this DC current bias $I_B$, there is superimposed, for the lines to be excited, an RF component, namely a very high frequency wave train. The frequency of this wave train is chosen in such a way that, during a period of excitation (or validation) of the lines in question, at least about ten alternations of these waves are sent. As can be seen from the characteristic $M=f(H)$ (M being the energy of magnetization of the non-linear elements 5, and H the field) of a material with non-linear magnetic properties such as Permalloy, excited along its difficult axis, the point of operation of a material such as this must be shifted towards a zone with a small radius of curvature (zone of the point A in FIG. 4) for which the sensitivity of the magnetic circuits of the invention is the highest. The shifting of the point of operation is obtained by said DC bias current $I_B$, giving a field $H_B$.

Each column wire is connected to a detection circuit collecting the signal read on the magnetic tape. This is possible through the fact that the pieces 5 are oblique to the column wires which can thus pick up the variations in flux going through these pieces.

Figure 5:
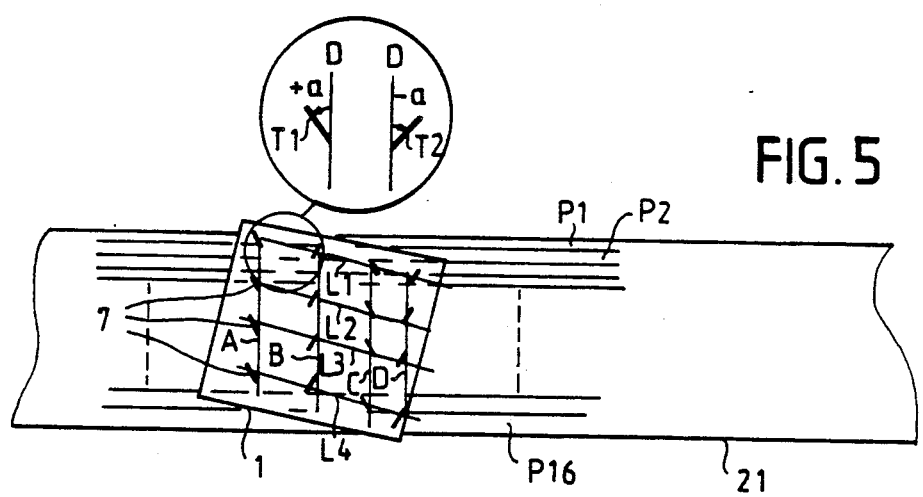
FIG. 5 is a schematic view showing the positioning of a head according to the invention with respect to a magnetic tape that it is reading.

Advantageously, as shown in FIG. 5, a magnetic head 1 is positioned slightly obliquely (at an angle of some degrees) to the running direction of the magnetic tape 21, so that it is possible to read a maximum number of tracks of this tape without thereby in any way making an unrealistic reduction (to below some tens of microns) in the pitch of the micro-heads of the head 1.

To simplify the explanations, it is assumed that the head 1 has four lines (L1 to L4 and four columns (A to D) of micro-heads.

The head 1 is arranged in such a way that the micro-heads (only the gaps 7 of these micro-heads are shown in FIG. 5) cooperating with the successive tracks in the following way, if P1 is called the first track and P16 the last one: the track P1 cooperates with the first micro-head (of the line L1) of the first column (A), the track P2 with the second micro-head (of the line L2) of the first column . . . , the track P4 with the fourth micro-head line L4) of the first column, the track P5 with the first micro-head of the second column (B), and so on until the track P16 which cooperates with the fourth micro-head of the fourth column. Advantageously, the different lines L1 to L4 are perpendicular to the magnetic tape path (or running direction of the tape), in order to standardize different types of heads. Advantageously, the gaps of the micro-heads corresponding to successive tracks are oriented alternately along a first direction and a second direction, these two directions being substantial symmetrical to a perpendicular to the direction of the running direction of the tape and forming, with respect to this perpendicular, an angle of about 10° to 45° (cf. for example, in the offset detail shown in FIG. 5, the first two micro-heads T1 and T2 which respectively form an angle $+a$ and an angle $-a$ with the straight line D which is perpendicular to the running direction of the tape).

Figure 6:
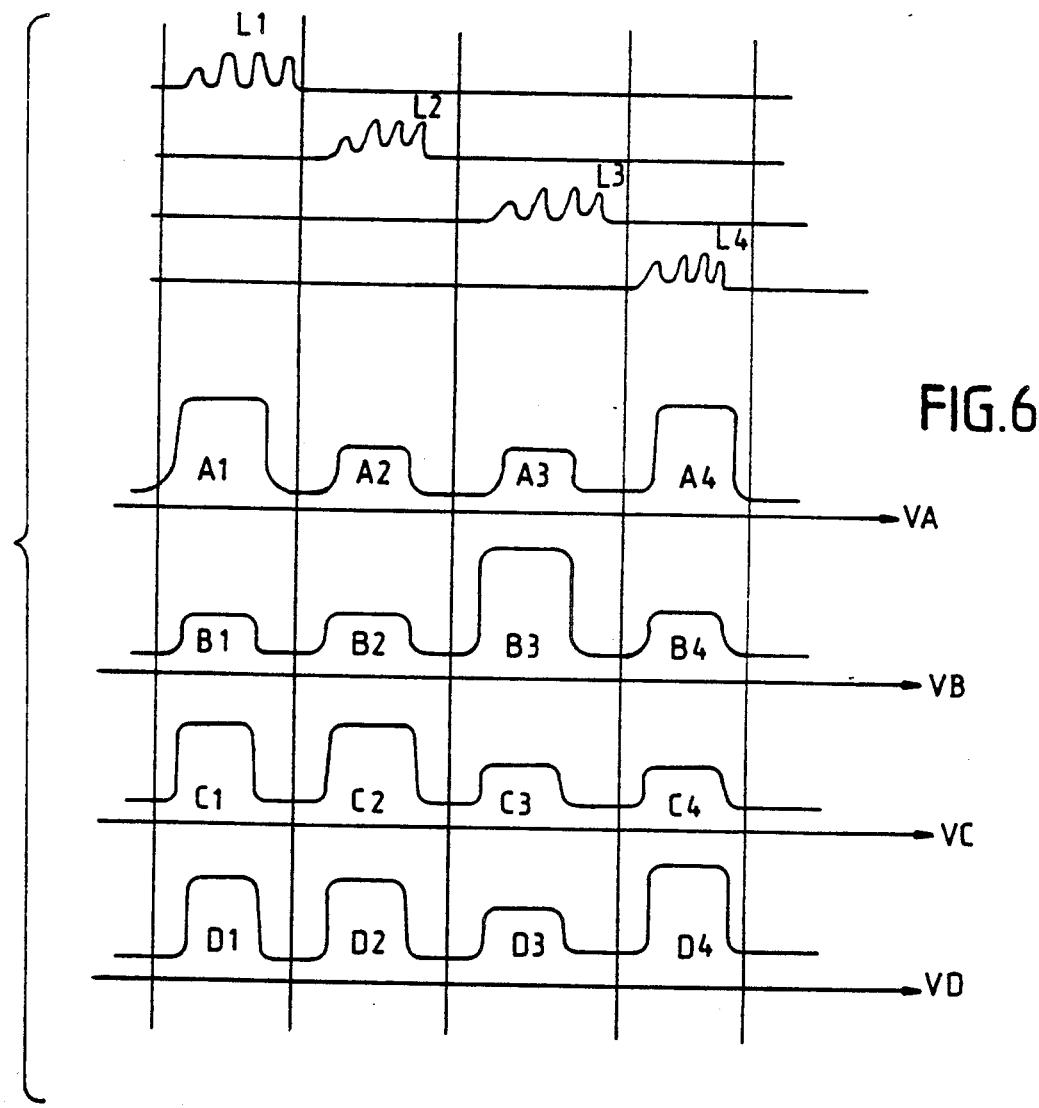
FIG. 6 is a timing diagram of some signals appearing in the head of FIG. 4.

To achieve the multiplexing of the micro-heads, bursts of RF oscillations are sent cyclically to the lines L1 to L4, as shown at the top of FIG. 6. The signals read by the respective micro-heads are recovered, after detection, at the columns A to D: these respective micro-heads are A1 to A4 for the column A, B1 to B4 for the column B etc. (A1 being the micro-head of the column A on the line L1, . . . ). It is then sufficient to process the signals of the different columns in the appropriate order.

According to an advantageous aspect of the invention, the current $I_B$ of the non-excited lines is eliminated. Thus, even if there is a non-negligible induction of the RF signal by stray couplings on the non-excited lines, this RF signal cannot cause the reading of the non-excited lines by the micro-heads, because the gain of the micro-heads for $M=0$ (FIG. 4) is far lower than the gain for $M=H_B$, and may even be almost zero.

According to yet another advantageous aspect of the invention, the sensitivity of the micro-heads is increased by adjusting the working frequency of the signal RF to a value close to the resonance frequency of the distributed circuit formed by the corresponding line and the micro-heads that border it.

According to a variant of the invention, the lines are all excited simultaneously but at different frequencies, and corresponding filters are connected to the different columns.

What is claimed is:

1. A static magnetic recording head, comprising:
   a plurality of excitation wires arranged substantially parallel to each other;
   a plurality of signal wires arranged substantially parallel to each other such that said excitation and signal wires intersect to form a matrix; and
   a plurality of elementary heads, each having a magnetic circuit with a substantially linear magnetization characteristic, including a non-linear magnetic element having a gap for reading a magnetic tape, each of said elementary heads being disposed at an intersection of said excitation and signal wires;
   wherein said plurality of elementary head comprises:
   a plurality of substantially trapezoidal blocks separated by grooves to form a matrix of said blocks;
   said non-linear magnetic elements being disposed on diagonally adjacent of said blocks; and
   said signal and excitation wires being disposed in said grooves.

2. A head according to claim 1, wherein the excitation wires are supplied with DC current on which high frequency signals are superimposed.

3. A head according to claim 1 connected to operate as a line-scanning and tape-exploring head.

4. A head according to claim 2, wherein the high frequency signals are wave trains with a frequency such that, during a period of excitation of the excited lines, at least ten alternations of these waves are sent.

5. A head according to claim 2, wherein the DC current is sent only to the excitation wires of the elementary heads to be excited.

6. A head according to claim 2, wherein the frequency of the high frequency signal has a value close to the value of the resonance frequency of the distributed circuit formed by the corresponding line and the elementary heads that border it.

7. A head according to claim 2, wherein all the lines of excitation wires are excited simultaneously but at different frequencies, and corresponding filters are connected to the different columns.

8. A head according to claim 1 comprising said elementary heads being arranged in lines and columns, wherein the lines of said elementary heads are obliquely disposed to a running direction of the magnetic tape to be read.

9. A head according to claim 8, wherein the columns of said elementary heads are perpendicularly disposed to the running direction of the magnetic tape.

10. A head according to claim 1, wherein said wires form a substantially orthogonal network, and wherein the non-linear element of each magnetic circuit is disposed obliquely with respect to each of the wires of the network.

11. A head according to claim 1, wherein the linear part of each magnetic circuit is made of a material with low relative permeability such as ferrite, and wherein its non-linear part is made of a material with high magnetic permeability such as Permalloy or Sendust.

12. A static magnetic recording head, comprising:
a plurality of excitation wires arranged substantially parallel to each other;
a plurality of signal wires arranged substantially parallel to each other such that said excitation and signal wires intersect to form a matrix; and
a plurality of elementary heads, each having a magnetic circuit with a substantially linear magnetization characteristic, including a non-linear magnetic element having a gap for reading a magnetic tape, each of said elementary heads being disposed at an intersection of said excitation and signal wires;
wherein the length of the parts of the magnetic circuits with a non-linear characteristic is substantially equal to the product of the relative permeability of these non-linear parts by their thickness.

13. A static magnetic recording head, comprising:
a plurality of excitation wires arranged substantially parallel to each other;
a plurality of signal wires arranged substantially parallel to each other such that said excitation and signal wires intersect to form a matrix; and
a plurality of elementary heads, each having a magnetic circuit with a substantially linear magnetization characteristic, including a non-linear magnetic element having a gap for reading a magnetic tape, each of said elementary heads being disposed at an intersection of said excitation and signal wires;
wherein the gaps of the elementary heads corresponding to successive tracks of the magnetic tape to be read are alternately oriented in a first direction and a second direction, these two directions forming substantially symmetrical angles with respect to a third direction perpendicular to the running direction of the tape.

14. A head according to claim 13, wherein the said two directions each make an angle of 10° to 45° with said third direction.

15. A static magnetic head, comprising:
a back plate having a plurality of substantially trapezoidal blocks arranged in a matrix and separated by a first and second plurality of substantially parallel intersecting grooves;
a plurality of excitation wires disposed in said first plurality of grooves;
a plurality of signal wires disposed in said second plurality of grooves;
a pair of pole pieces with a gap therebetween disposed on corresponding of said blocks such that said gap is disposed over each intersection of one of said excitation wires with one of said signal wires.

* * * * *